(12) United States Patent
Lin et al.

(10) Patent No.: US 7,296,838 B2
(45) Date of Patent: Nov. 20, 2007

(54) MOTOR-DRIVEN VEHICLE WITH TWO VEHICLE BODIES THAT ARE INTERCONNECTED REMOVABLY

(75) Inventors: Ching-Yao Lin, Chia Yi Hsien (TW); Samuel Lin, Chia Yi Hsien (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 255 days.

(21) Appl. No.: 11/146,446

(22) Filed: Jun. 7, 2005

(65) Prior Publication Data

US 2006/0273607 A1 Dec. 7, 2006

(51) Int. Cl.
*B62D 27/00* (2006.01)

(52) U.S. Cl. ......................................... 296/29
(58) Field of Classification Search .................. 296/29, 296/187.01, 35.1
See application file for complete search history.

(56) References Cited

U.S. PATENT DOCUMENTS 7,028,799 B2 * 4/2006 Lin .............................. 180/208

| | | | |
|---|---|---|---|
| 2003/0067151 A1 * | 4/2003 | Lin | 280/781 |
| 2005/0139410 A1 * | 6/2005 | Fan | 180/311 |
| 2005/0224275 A1 * | 10/2005 | Lin | 180/311 |
| 2006/0283645 A1 * | 12/2006 | Lin et al | 180/208 |

* cited by examiner

*Primary Examiner*—H Gutman
(74) *Attorney, Agent, or Firm*—McNees Wallace & Nurick LLC

(57) ABSTRACT

A motor-driven vehicle includes a first vehicle body with a fixed cantilever disposed at a front end thereof, and a second vehicle body with a fixed post disposed in front of the cantilever, and a connecting device interconnecting the first and second vehicle bodies removably. The connecting device includes a projection extending upwardly from a front end of the cantilever of the first vehicle body, and a spring-biased retaining block disposed movably on the post of the second vehicle body. The retaining block is biased to a position, where the projection is confined between the retaining block and the post so as to prevent relative movement of the first and second vehicle bodies.

10 Claims, 5 Drawing Sheets

MOTOR-DRIVEN VEHICLE WITH TWO VEHICLE BODIES THAT ARE INTERCONNECTED REMOVABLY

BACKGROUND OF THE INVENTION

1. Field of the Invention

This invention relates to a motor-driven vehicle, and more particularly to a motor-driven vehicle that has two vehicle bodies, which are interconnected removably.

2. Description of the Related Art

A conventional motor-driven vehicle includes front and rear vehicle bodies that are interconnected removably. When the front and rear vehicle bodies are removed from each other, it is convenient to transport and store the same. Such a vehicle, however, is typically hard to assemble and disassemble.

SUMMARY OF THE INVENTION

The object of this invention is to provide a motor-driven vehicle that includes two vehicle bodies, which can be interconnected and disconnected from each other with ease.

According to this invention, a motor-driven vehicle includes a first vehicle body with a fixed cantilever disposed at a front end thereof, and a second vehicle body with a fixed post disposed in front of the cantilever, and a connecting device interconnecting the first and second vehicle bodies removably. The connecting device includes a projection extending upwardly from a front end of the cantilever of the first vehicle body, and a spring-biased retaining block disposed movably on the post of the second vehicle body. The retaining block is biased to a position, where the projection is confined between the retaining block and the post so as to prevent relative movement of the first and second vehicle bodies.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
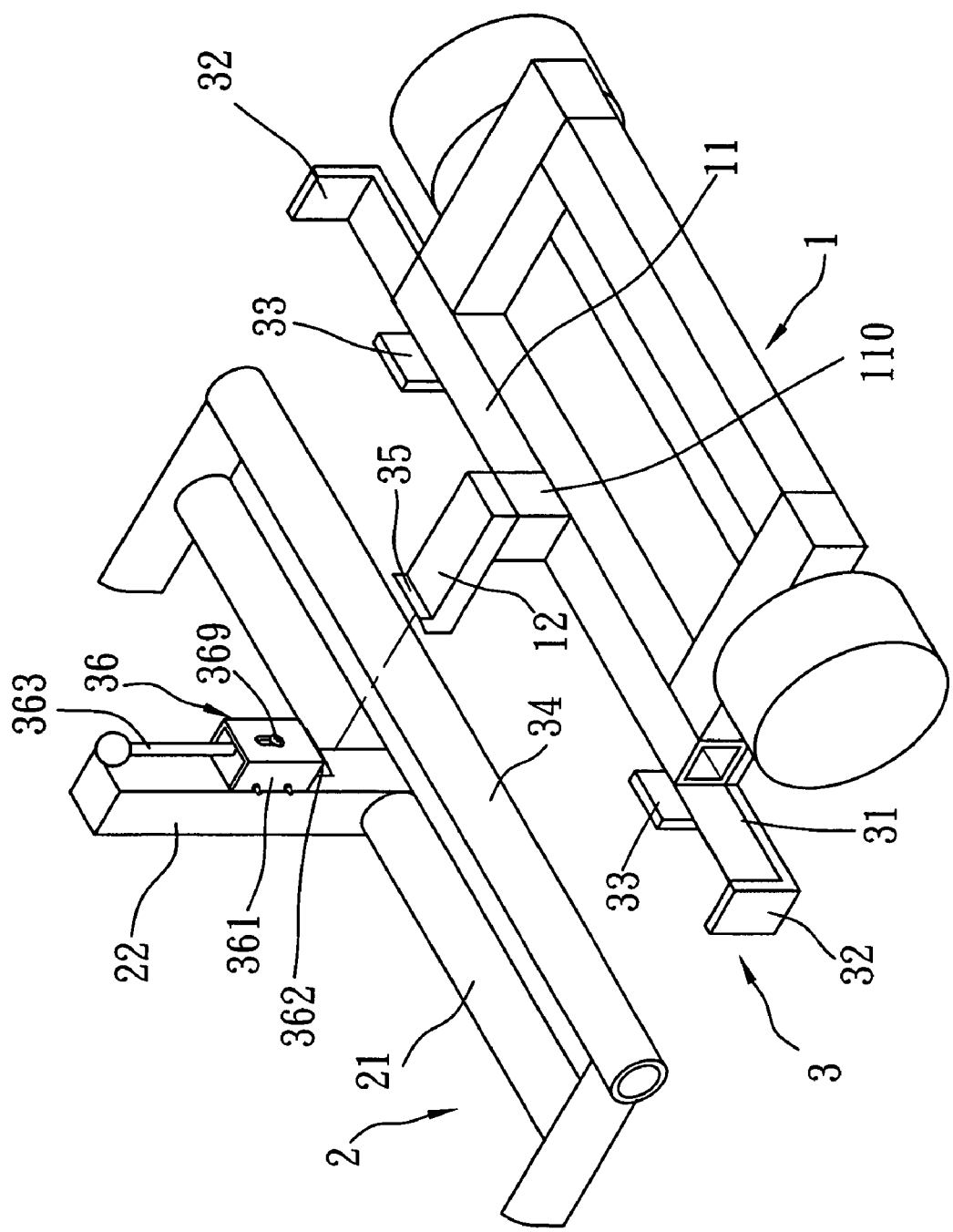
FIG. 1 is a fragmentary, partly exploded perspective view of the preferred embodiment of a motor-driven vehicle according to this invention.
Figure 2:
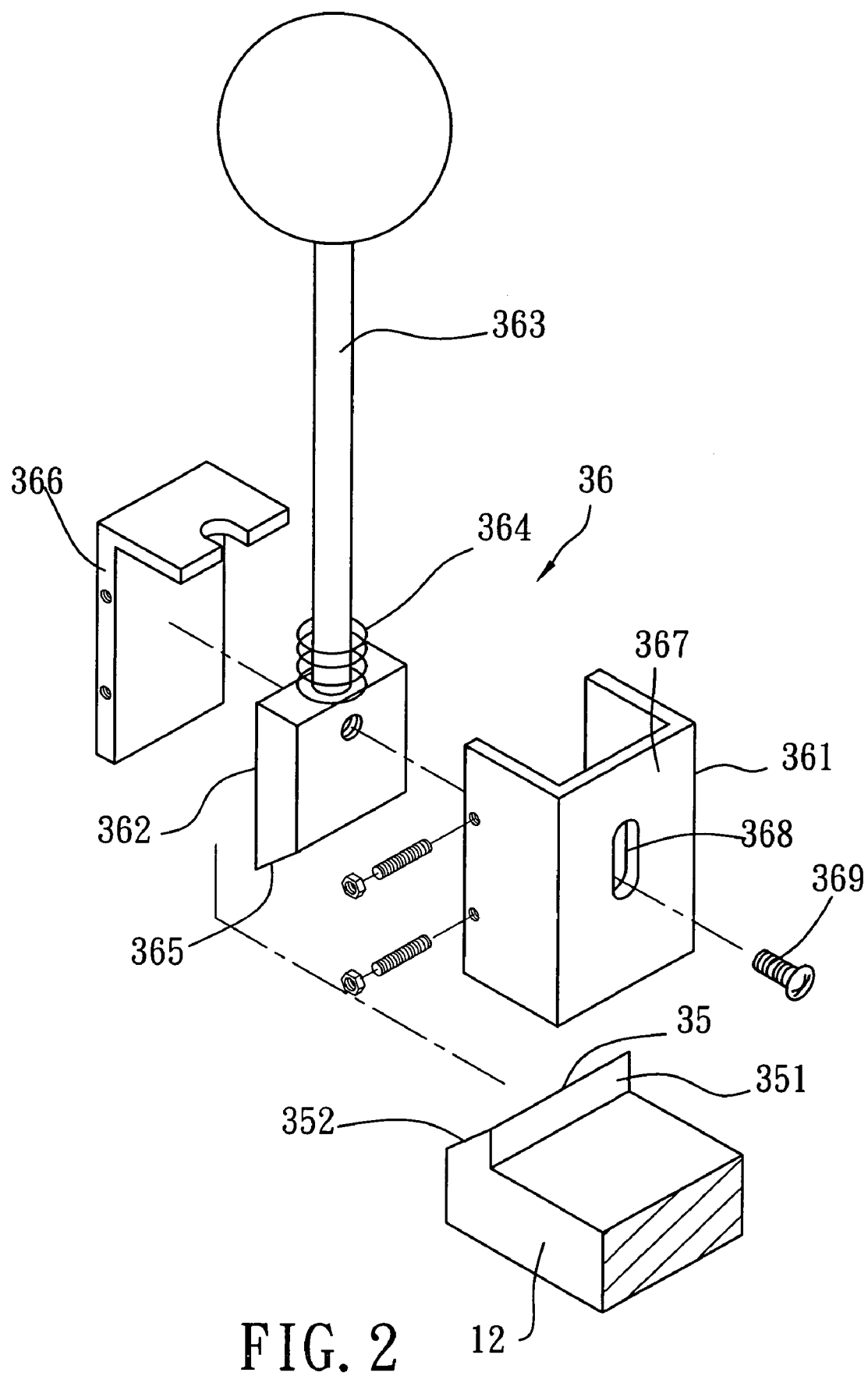
FIG. 2 is an exploded perspective view of a retaining unit of the preferred embodiment.
Figure 3:
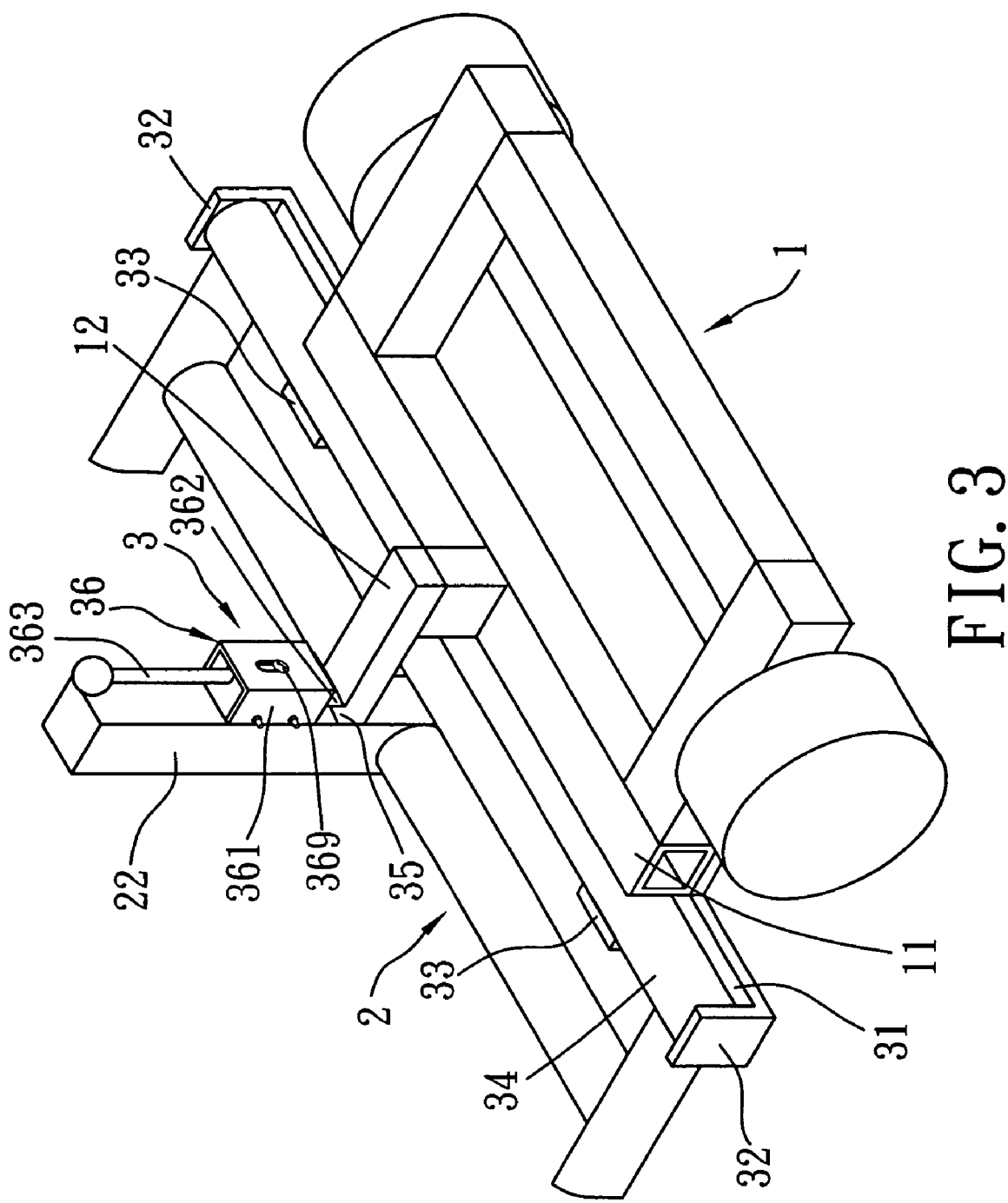
FIG. 3 is a fragmentary assembled perspective view of the preferred embodiment.
Figure 4:
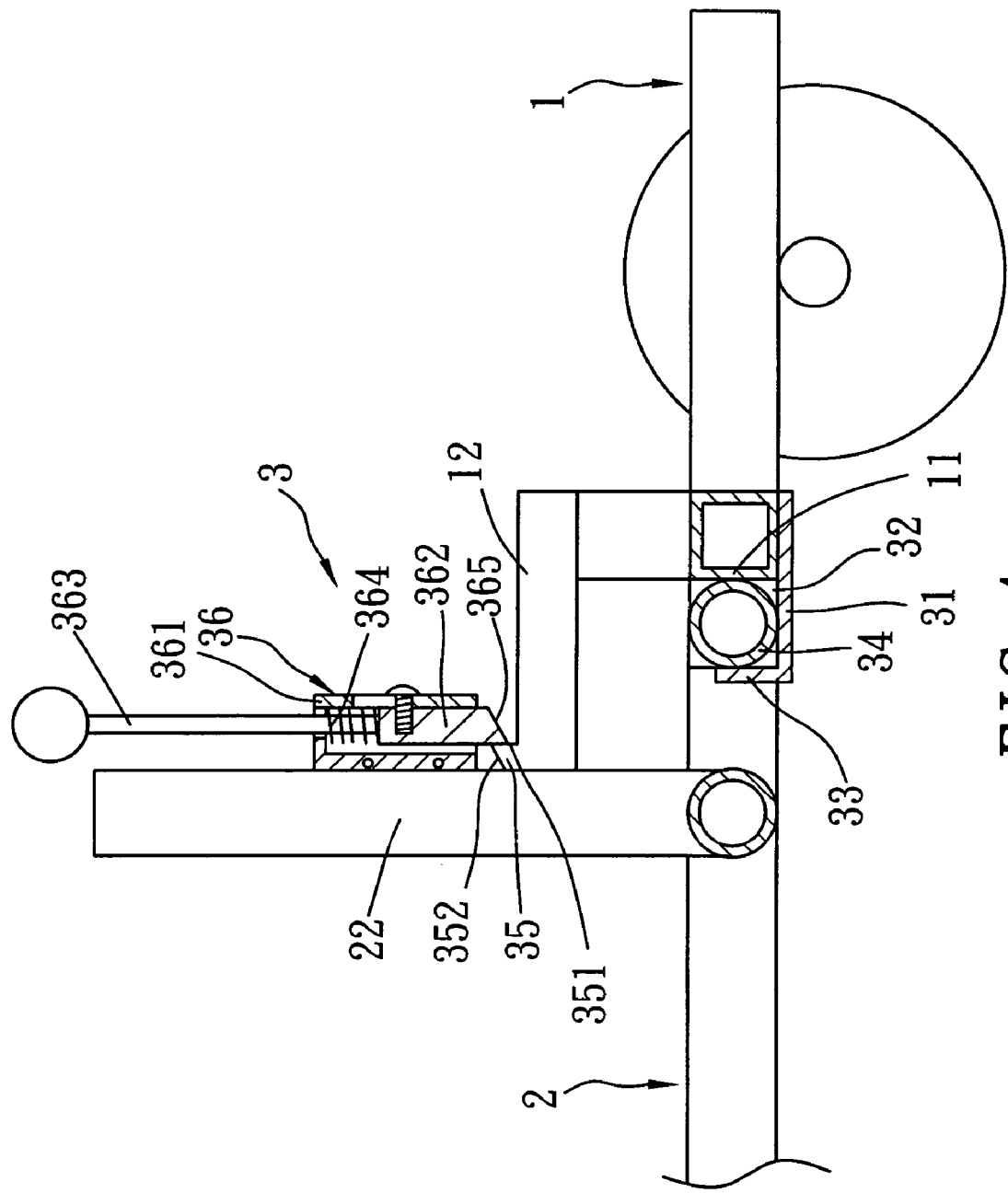
FIG. 4 is a fragmentary, partly sectional side view of the preferred embodiment.

Referring to FIGS. 1, 2, 3 and 4, the preferred embodiment of a motor-driven vehicle according to this invention includes a first vehicle body 1, a second vehicle body 2 disposed in front of the first vehicle body 1, and a connecting device 3 interconnecting the first and second vehicle bodies 1, 2.

The first vehicle body 1 includes a hollow front end rod 11 having a square cross section, a projecting block 110 (see FIG. 1) fixed on a middle portion of a top surface of the front end rod 11, and a horizontal cantilever 12 fixed on the projecting block 110 and extending forwardly from a top end of the projecting block 110.

The second vehicle body 2 includes a mounting rod 21 parallel to the front end rod 11, and a post 22 fixed on and extending upwardly from a middle portion of the mounting rod 21. The post 22 is disposed in front of and aligned with the cantilever 12.

The connecting device 3 includes a horizontal supporting plate 31, two vertical end plates 32, two spaced-apart vertical side plates 33, a horizontal engagement rod 34 connected fixedly to and spaced apart from the mounting rod 21, a projection 35 extending upwardly from a front end of the cantilever 12, and a retaining unit 36 disposed on a rear side of the post 22. The supporting plate 31 has a rear side portion connected fixedly to a bottom end of the front end rod 11 of the first vehicle body 1, and is disposed behind and below the projection 35. The engagement rod 34 is disposed behind and parallel to the mounting rod 21, and is superposed on the supporting plate 31. The end plates 32 extend respectively, integrally, and upwardly from left and right ends of the supporting plate 31. The engagement rod 34 is disposed between the end plates 32. The end plates 32 are adjacent respectively to left and right ends of the engagement rod 34. The side plates 33 extend integrally and upwardly from a front side of the supporting plate 31, and are disposed in front of the engagement rod 34. As such, the engagement rod 34 is confined between the front end rod 11 of the first vehicle body 1 and the side plates 33.

The projection 35 has a vertical rear side surface 351 and a forwardly and downwardly inclined top surface 352. The retaining unit 36 includes a hollow housing 361 disposed fixedly on the post 22, a retaining block 362 confined within the housing 361, a pull rod 363 connected fixedly to the retaining block 362 and projecting outwardly from the housing 361, and a resilient member 364 disposed within the housing 361 and biasing the retaining block 362 to project downwardly from the housing 361. As a result, a lower end of the retaining block 362 abuts against the vertical rear side surface 351 of the projection 35 so as to confine the projection 35 between the retaining block 362 and the post 22. This prevents relative movement of the first and second vehicle bodies 1, 2. The retaining block 362 is formed with a forwardly and downwardly inclined guiding surface 365.

The housing 361 consists of an L-shaped plate 366 and a U-shaped plate 367. The resilient member 364 is configured as a coiled compression spring, and is sleeved on the pull rod 363 between the L-shaped plate 366 and the retaining block 362. The housing 361 is formed with a slide slot 368 that has two closed ends. The retaining unit 36 further includes a limiting member 369 that is configured as a bolt. The limiting member 369 extends through the slide slot 368 in the housing 361, and is connected fixedly to the retaining block 362. As such, the retaining block 362 is movable within the housing 362 by a distance that is smaller than the length of the slide slot 368.

Figure 5:
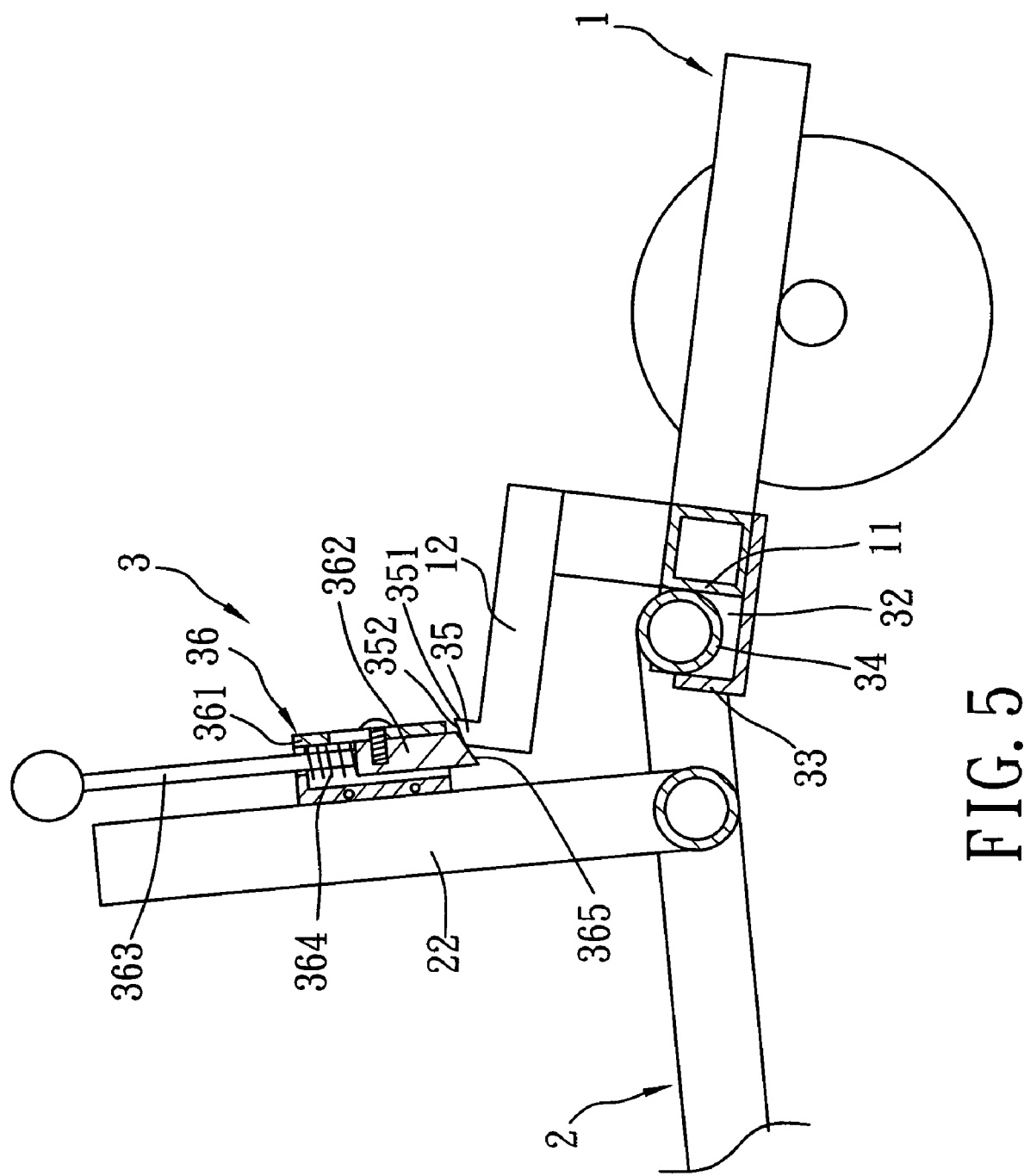
FIG. 5 is a fragmentary, partly sectional side view of the preferred embodiment, illustrating how an engagement rod of a second vehicle body is placed onto a horizontal supporting plate of a first vehicle body.

During assembly of the first and second vehicle bodies 1, 2, the first vehicle body 1 is disposed behind the second vehicle body 2, as shown in FIG. 1. A front end of the first vehicle body 1 and a rear end of the second vehicle body 2 are slightly lifted, and are then moved toward each other so as to put the engagement rod 34 into a space defined among the supporting plate 31, the end plates 32, the side plates 33 and the front end rod 11, as shown in FIG. 5. Subsequently, the front end of the first vehicle body 1 and the rear end of the second vehicle body 2 are released so that the first and second vehicle bodies 1, 2 are leveled from their tilted positions, thereby resulting in the cantilever 12 moving forwardly toward the post 22. Hence, the inclined top surface 352 of the projection 35 moves over the inclined guiding surface 365 of the retaining block 362 so as to push the retaining block 362 further into the housing 361. When the projection 35 moves past the retaining block 362 to contact the post 22, the resilient member 364 biases the retaining block 362 to move to the position shown in FIG. 4.

When it is desired to remove the first and second vehicle bodies 1, 2 from each other, the pull rod 363 is pulled upwardly. This results in separation of the retaining member 362 from the projection 35, and therefore allows the engagement rod 34 to be removed from the first vehicle body 1.

From the foregoing, it is evident that the first and second vehicle bodies 1, 2 of the motor-driven vehicle of this invention can be interconnected and disconnected from each other with ease. The object of this invention is therefore achieved.

With this invention thus explained, it is apparent that numerous modifications and variations can be made without departing from the scope and spirit of this invention. It is therefore intended that this invention be limited only as indicated by the appended claims.

We claim:

1. A motor-driven vehicle comprising:
a first vehicle body including a fixed cantilever disposed at a front end thereof;
a second vehicle body including a fixed post disposed in front of said cantilever; and
a connecting device interconnecting said first and second vehicle bodies removably and including a projection extending upwardly from a front end of said cantilever of said first vehicle body, and a spring-biased retaining block disposed movably on said post of said second vehicle body and biased to a position, where said projection is confined between said retaining block and said post so as to prevent relative movement of said first and second vehicle bodies.

2. The motor-driven vehicle as claimed in claim 1, wherein said projection has a vertical rear side surface, said connecting device further including a hollow housing, a pull rod and a resilient member, said housing being disposed fixedly on said post, said retaining block being disposed movably within said housing, said pull rod being connected fixedly to said retaining block and projecting outwardly from said housing, said resilient member being disposed within said housing and biasing said retaining block to project downwardly from said housing such that, during assembly of said first and second vehicle bodies, said cantilever of said first vehicle body is moved toward said post of said second vehicle body so that said projection pushes said retaining block to retract into said housing, after which said retaining block is biased by said resilient member to project downwardly from said housing so that a lower end of said retaining block abuts against said vertical rear side surface of said projection when said projection moves past said retaining block to contact said post, thereby confining said projection between said retaining block and said post.

3. The motor-driven vehicle as claimed in claim 2, wherein said retaining block has a forwardly and downwardly inclined guiding surface, said projection further having a forwardly and downwardly inclined top surface that is movable over said guiding surface of said retaining block so as to retract said retaining block into said housing during assembly of said first and second vehicle bodies.

4. The motor-driven vehicle as claimed in claim 2, wherein said housing is formed with a slide slot that has two closed ends, said connecting device further including a limiting member that extends through said slide slot in said housing and is connected fixedly to said retaining block so that said retaining block is movable within said housing by a distance that is smaller than a length of said slide slot.

5. The motor-driven vehicle as claimed in claim 2, wherein said connecting device further includes a horizontal supporting plate that is connected fixedly to said first vehicle body and that is disposed behind and below said projection, and a horizontal engagement rod that is superposed on said supporting plate.

6. The motor-driven vehicle as claimed in claim 5, wherein said support plate has opposite left and right ends, said connecting device further including two vertical end plates extending respectively, integrally, and upwardly from said left and right ends of said supporting plate, said engagement rod being disposed between said end plates.

7. The motor-driven vehicle as claimed in claim 6, wherein said first vehicle body includes a hollow front end rod extending parallel to said engagement rod, said supporting plate having a front side and a rear side portion that is connected fixedly to a bottom end of said front end rod, said connecting device further including two spaced-part vertical side plates extending integrally and upwardly from said front side of said supporting plate and disposed in front of said engagement rod so as to confine said engagement rod between said front end rod of said first vehicle body and said side plates.

8. The motor-driven vehicle as claimed in claim 1, wherein said connecting device further includes a horizontal supporting plate that is connected fixedly to said first vehicle body and that is disposed behind and below said projection, and a horizontal engagement rod that is superposed on said supporting plate.

9. The motor-driven vehicle as claimed in claim 8, wherein said support plate has opposite left and right ends, said connecting device further including two vertical end plates extending respectively, integrally, and upwardly from said left and right ends of said supporting plate, said engagement rod being disposed between said end plates.

10. The motor-driven vehicle as claimed in claim 9, wherein said first vehicle body includes a hollow front end rod extending parallel to said engagement rod, said supporting plate having a front side and a rear side portion that is connected fixedly to a bottom end of said front end rod, said connecting device further including two spaced-part vertical side plates extending integrally and upwardly from said supporting plate and disposed in front of said engagement rod so as to confine said engagement rod between said front end rod of said first vehicle body and said side plates.

* * * * *